June 8, 1965  A. FISCHER  3,188,030

CLAMP OR HANGER FOR CABLES AND THE LIKE

Filed Dec. 11, 1962

INVENTOR:
ARTUR FISCHER
BY
Michael J. Striker
his ATTORNEY

United States Patent Office 3,188,030
Patented June 8, 1965

3,188,030
CLAMP OR HANGER FOR CABLES AND THE LIKE
Artur Fischer, Tumlingen, Kreis Freudenstadt, Germany
Filed Dec. 11, 1962, Ser. No. 243,849
Claims priority, application Germany, Dec. 11, 1961,
F 35,522
19 Claims.  (Cl. 248—68)

The present invention relates to fixtures which are utilized for guiding cables, pipes, hoses, rods, bars and similar elongated bodies of circular, oval, polygonal or other cross-sectional outline along walls, ceilings, floors or other types of supports. More particularly, the invention relates to an improved fixture in the form of a clamp or hanger which is especially suited to form with one or more similar fixtures a bank or row of clamps or hangers for a series of electric cables or the like.

It is an important object of the present invention to provide a very simple and inexpensive clamp or hanger which may be manufactured of readily available materials, which can be rapidly assembled or taken apart without necessitating the utilization of any tools or with the help of conventional tools, which is of eye-pleasing appearance, and which is capable of supporting and guiding cables of different diameters.

Another object of the invention is to provide a clamp or hanger of the just outlined characteristics which may be assembled with one or more similar devices into a bank or row of guides for cables or pipes of different diameters and which is constructed and assembled in such a way that it can hold differently dimensioned cables, pipes or similar bodies at the same distance from a support so that a series of cables or the like which are held by such rows of clamps or hangers is one of eye-pleasing appearance.

A further object of the invention is to provide a fixture of the above outlined characteristics which may be used as a clamp or hanger without necessitating any alterations in the construction or mounting of its parts.

An additional object of the invention is to provide a clamp or hanger of the above outlined characteristics which, in addition to maintaining a cable or pipe at a desired distance from its support, is also capable of preventing or hindering undesirable axial displacements of such bodies, especially if it is used in connection with armored or other types of cables whose mantles consist of soft plastic material.

A concomitant object of the invention is to provide a clamp or hanger which may be secured to all kinds of supports by many different types of anchoring devices and which can withstand the corrosive action of atmospheric air, of water and of materials of which a cable, pipe or another elongated body consists.

Still another object of the invention is to provide a clamp or hanger which is constructed in such a way that it can be readily manipulated by persons having little technical skill, which can be manufactured in many different sizes and shapes, and which can be taken apart and reused as often as desired.

With the above objects in view, the invention resides in the provision of a fixture, such as a clamp or hanger for cables and similar elongated bodies, which comprises a housing defining a body-receiving through opening, and resilient means for biasing the body against the housing. In accordance with a feature of the invention, the housing may comprise two separable sections one of which carries the resilient means, such as one or more bendable fingers or similar members, for biasing the body against the other section. The through opening may be of circular, oval or polygonal outline and may consist of two registering cutouts which are provided in the two sections. The material of the sections is preferably a corrosion-resistant plastic which cannot be attacked by softeners normally present in the plastic coatings or mantles of electric cables.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
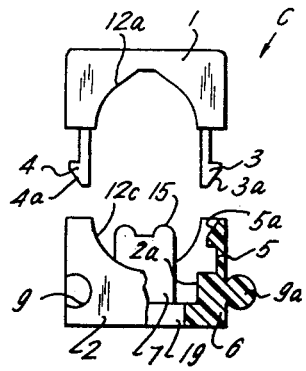
FIG. 1 is a front elevational view of a cable clamp in taken-apart condition, a portion of the lower clamp section being broken away to illustrate one of several recesses which receive resiliently mounted coupling projections of the upper section when the clamp is assembled.
Figure 2:
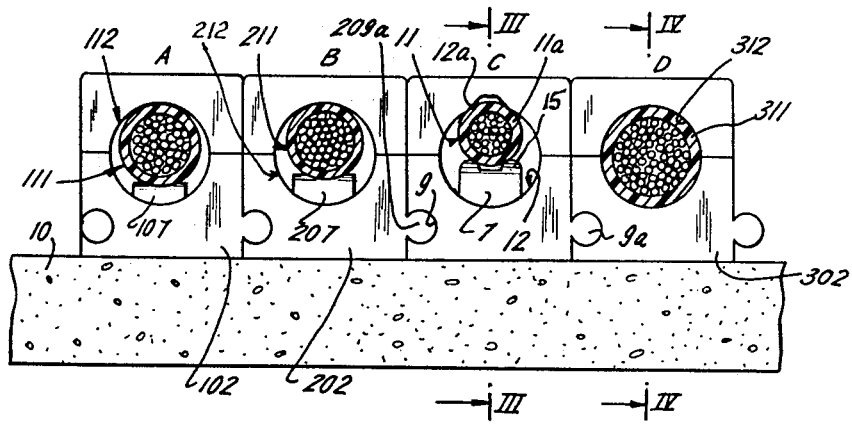
FIG. 2 is a front elevational view of a bank of fully assembled and properly aligned clamps each of which supports and guides a differently dimensioned cable.
Figure 3:
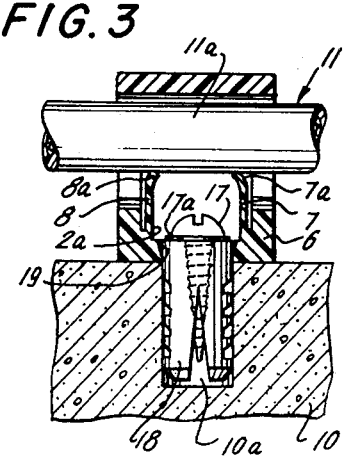
Figure 4:
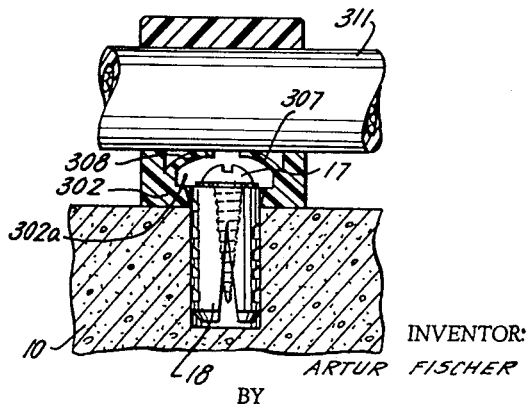

FIG. 3 is a transverse vertical section through the clamp of FIG. 1 as viewed in the direction of arrows from the line III—III of FIG. 2, showing the manner in which resiliently deformable fingers of the lower section bias a cable against the upper section; and FIG. 4 is a transverse vertical section through another clamp as seen in the direction of arrows from the line IV—IV of FIG. 2, showing the manner in which the resilient fingers are deformed when the through opening of the clamp accommodates a large-diameter cable.

Referring now in greater detail to the illustrated embodiments, and first to FIG. 1, there is shown a fixture in the form of a cable clamp C which comprises a two-piece housing including an upper section 1 and a lower section 2. These sections consist of tough corrosion-resistant synthetic plastic material, preferably of a type capable of withstanding the action of softeners which are normally present in the comparatively soft plastic mantle or shell 11a of an electric cable 11, see FIG. 2.

The sections 1, 2 are provided with male and female coupling means which enable an operator to rapidly connect or separate the same. In the illustrated embodiment, the coupling means comprises at least two resilient projections 3, 4 which depend from the underside of the section 1 and whose heads may be received in recesses 5 (only one shown) defined by the lower section 2. It will be noted that the heads of the projections 3, 4 and the walls of the lower section 2 are formed with inclined guide faces 3a, 4a, 5a to facilitate introduction of such heads into the respective recesses.

The sections 1, 2 are respectively formed with registering cutouts 12a, 12c which together define a through opening or bore 12 (see FIG. 2) when the housing of the clamp C is assembled and is ready to support and to guide the cable 11. The lower section 2 is formed with an internal chamber 2a which communicates with the cutout 12c and which accommodates two upwardly extending resilient members here shown as fingers 7, 8 (see FIG. 3) serving as a means for permanently biasing the mantle 11a of the cable 11 against the housing, i.e., against the upper section 1. The fingers 7, 8 are integral with the bottom wall 6 of the lower section 2 and their upper end portions or tips 7a, 8a are normally bent slightly toward each other to insure that the fingers will be deflected toward each other (see FIG. 4) when they are deformed by a cable, by a pipe or a similar elongated body. It will be noted that the fingers 7, 8 are disposed intermediate the recesses 5, and that they are substantially perpendicular to the plane of the bottom wall 6, and that, when not deformed, their tips 7a, 8a extend substantially to the level of the upper end face of the lower section, i.e., into the cutout 12c of this lower section. The bottom wall 6 is provided with a centrally located vertical bore 19 for the slotted sleeve 18 of an anchoring device here shown as an expansion anchor which serves as a means for securing the clamp to a support 10, for example, a masonry wall made of gypsum, brick, cement or a similar brittle substance which cannot retain a threaded screw bolt or the like. As shown in FIG. 3, the sleeve 18 is inserted into a predrilled expansion anchor hole 10a of the support 10 and is expanded by a screw bolt 17 e.g., a wood screw so that its externally toothed tongues expand and bite into the material of the support in order to insure that the lower section 2 is held in requisite position. The bottom wall 6 may engage the unslotted upper portion of the sleeve 18 merely by friction, or the washer 17a of the expansion anchor may be of such diameter that it overlaps the bottom wall 6 and thus prevents separation of the lower section 2 from the sleeve. It will be noted that the depth of chamber 2a is selected in such a way that the head of the bolt 17 does not extend upwardly and beyond the lowermost point of the cutout 12c, i.e., that a cable whose diameter is identical with the diameter of the through opening (see FIG. 4) cannot come into contact with the expansion anchor.

Referring back to FIG. 1, the clamp C comprises a second coupling means which serves to connect this clamp to a pair of similarly constructed clamps B, D shown in FIG. 2. The second coupling means comprises a horizontal rib 9a which projects beyond one lateral side of the lower section 2 and a complementary groove 9 which is formed in the other lateral side of the lower section. The two lateral sides are preferably parallel to each other. The manner in which the coupling means 9, 9a of adjacent clamps cooperate to maintain the clamps in requisite position of alignment (side-by-side) is self-evident and is shown in FIG. 2.

Since the clamp C of FIGS. 1 and 3 is assumed to accommodate and to guide a cable 11 whose diameter is much smaller than the diameter of the through opening 12, I prefer to form the cutout 12a in the upper section 1 in such a way that the polygonal wall bounding this cutout automatically compels the mantle 11a of the cable 11 to assume a predetermined position midway between the projections 3, 4 in which its axis is located in the common symmetry plane of the sections 1, 2, this symmetry plane coinciding with the section line III—III of FIG. 2. This is attained by flattening mirror-symmetrically arranged portions of the wall bounding the cutout 12a so that such flattened portions converge upwardly toward the symmetry plane. When the underside of the mantle 11a is engaged by the tips 7a, 8a, of the two resilient fingers, the mantle is automatically urged against the flattened portions of the wall bounding the cutout 12a and is thereby centered in the position of FIG. 2. It will be noted that the tips 7a, 8a are provided with teeth 15 (see particularly FIGS. 1 and 2) which penetrate into the comparatively soft material of the mantle 11a and thereby hold the cable 11 against undesirable axial displacements in the opening 12. As stated hereinabove, the material of the fingers 7, 8 is preferably such that it can resist the corrosive action of softeners which are normally present in the material of the mantle 11a. Of course, if the clamp C is used to support and to guide a pipe which expands at elevated temperatures, the fingers 7a, 8a will yield and will permit necessary axial displacements of the pipe.

The clamp C is assembled as follows:

It is assumed that the masonry structure 10 already supports the clamps A and B of FIG. 2. The operator then drills the hole 10a for the sleeve 18 and thereupon couples the lower section 2 to the lower section 202 of the clamp B merely by aligning the groove 9 with the rib 209a of the lower section 202 and by thereupon sliding the section 2 in a direction at right angles to the plane of the drawings. In the next step, the operator inserts the sleeve 18 into the predrilled hole 10a, applies the washer 17a, and thereupon drives the screw bolt 17 home to such an extent that the tongues of the sleeve engage the material of the support 10 and thereby secure the lower section 2 in requisite position. After placing the cable 11 into the cutout 12c and onto the finger tips 7a, 8a, the operator couples the upper section 1 to the lower section 2 whereby the fingers 7, 8 automatically press the mantle 11a against the flattened portions of walls surrounding the cutout 12a so that the uppermost point of the mantle 11a is at the same level and hence in a common plane with the uppermost points of the cables 111, 211 which are respectively accommodated in the openings 112, 212 of the clamps A and B.

It goes without saying that it is often sufficient to form the lower section 2 with a single resilient member, i.e., to omit the finger 7 or 8, and that it is equally possible to form the upper section 1 with one or more resilient fingers which may center the mantle 11a in the opening 12 by counteracting the bias of the fingers 7, 8. Furthermore, it is also possible to form the upper section 1 with three or more coupling projections, to reverse the position of the projections 3, 4 and of the recesses 5, and/or to form projections and recesses on each of the sections. All such modifications are so obvious that they can be readily comprehended without additional illustrations.

If an operator thereupon desires to remove the cable 11 from the opening 12, he merely pulls the upper section 1 away from the lower section 2 with sufficient force to deform the stems of the projections 3, 4 and to withdraw the heads of these projections from the respective recesses 5. The cable 11 is then exposed and may be removed from the cutout 12c so that the fingers 7, 8 may return to their unstressed positions.

If the fixture of FIG. 1 is used as a cable hanger or pipe hanger, the lower section 2 becomes the upper section. For example, if the masonry structure 10 forms part of a ceiling and the cable 11 must be laid along the underside of the ceiling in such a way that its lowermost point is in the same plane with the lowermost points of the cables 111, 211, 311, the fingers 7, 8 will automatically maintain the cable 11 in such position as soon as the mantle 11a is inserted into the cutout 12a or 12c and as soon as the section 1 (which is then the lower section) is coupled to the other section. The fixtures A, B, C and D are equally useful for supporting cables, pipes and similar elongated bodies along vertical walls or along inclined walls whenever a series of cables must be arranged in a way to insure that the resulting system of cables lines is one of eye-pleasing appearance.

The clamps A, B and D differentiate from the clamp C mainly in that they are respectively formed with circular through openings 112, 212, 312 for the cables 111, 211, 311, respectively. The diameter of the cable 311 is practically identical with the diameter of the through opening 312. Therefore, the fingers 307, 308 of the lower section 302 are deformed into substantial parallelism with the axis of the cable 311. It will be noted that the distance between the roots of the fingers 307, 308 exceeds the combined length of these fingers so that their tips cannot come into abutment with each other even if the fingers are subjected to maximal deformation in a manner as shown in FIG. 4. Furthermore, the depth of the chamber 302a in the lower section 302 of the clamp D is such that the head of the screw bolt 17 is out of contact with the fingers 307, 308 even if the diameter of the cable equals or closely approaches the diameter of the through opening.

The diameters of the cables 111, 211 are greater than the diameter of the cable 11 but smaller than the diameter of the cable 311. Consequently, the fingers of the lower sections forming part of the clamps A, B are subjected to greater deformation than the fingers 7, 8 of the lower section 2. This is shown in FIG. 2 which respectively illustrates the fingers 107, 207 of the lower sections 102, 202.

An important advantage of my improved clamp or hanger is that it may be utilized to support and to guide cables whose diameters may vary within a very wide range. As a rule, such cables comprise extruded mantles which consist of synthetic plastic material and which are not manufactured with great precision, i.e., it can happen that a zone of the mantle 11a has a diameter which is greater or smaller than the diameter of another zone of the same mantle.

Another important advantage of the improved clamp or hanger is that it is equally capable of supporting flexible or rigid pipes, hoses and similar elongated bodies, that it may be used as a clamp or hanger without any modification of its parts, and that it is capable of retaining a cable or the like in proper alignment with one or more additional cables even if the diameters of the cables are different. The bank of clamps which are mounted in a manner as shown in FIG. 2 is of eye-pleasing appearance, each cable may be readily and rapidly withdrawn from the respective clamp, and each cable may be rapidly reinserted into the respective clamp without necessitating special tools for such operations. The fingers of the lower clamp sections always maintain the uppermost points of all cables at the same distance from the support 10 even if the diameters of the cables are as different as the diameters of the cables 11 and 311.

It is to be understood that the tips of the fingers may extend into the cutouts of the respective upper sections, particularly when the diameter of a cable is less than the depth of the cutout in the upper section.

For example, the diameter of the cable 11 may be 7 mm. and the diameter of the cable 311 may be about 10 mm. If desired the through opening of each clamp may be of polygonal outline, especially if the openings are dimensioned in such a way that their transverse dimensions normally exceed the diameters of the cables.

Of course, when the clamps are mounted on supports which consist of wood, metal or plastic, the expansion anchors 17, 17a, 18 may be replaced by other types of attaching or anchoring devices, such as metal screws, wood screws, threaded bolts which are fired into the material of the support and which may mate suitable nuts, or the like.

In the appended claims, the clamp or hanger of my invention is called a fixture which is utilized to hold and to guide elongated bodies of circular or other cross sectional outline. The expression "elongated bodies" is intended to embrace all types of cables, pipes, hoses, rods, bars and similar objects.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the means and range of equivalence of the following claims.

What is claimed as new and desired to be secured by Letters Patent is:

1. A fixture for cables and similar elongated bodies, comprising a housing defining a body-receiving through opening, said housing having a first portion disposed at one side of said opening and a second portion disposed at the other side of said opening; and resilient means constituting an integral part of one of said portions and arranged to directly engage a body which is received in said opening for biasing such body against the other portion of said housing.

2. A fixture for cables and similar elongated bodies, comprising a housing including a plurality of separable sections which together define a through opening; and resilient means constituting an integral part of one of said sections and arranged to directly engage a body which is received in said opening for biasing such body against another section.

3. A fixture for supporting any one of a series of differently dimensioned cables and similar elongated bodies, comprising a housing including two separable sections which together define a body-receiving through opening, said opening being of sufficiently large diameter to accommodate the largest of such series of elongated bodies and resilient means constituting an integral part of one of said sections and having a portion normally extending into said opening and arranged to directly engage that one of said bodies which is received in said opening for biasing that body against the other section.

4. A fixture for cables and similar elongated bodies, comprising a housing of corrosion-resistant synthetic plastic material, said housing defining a body-receiving through opening; and resilient means constituting an integral part of said housing and arranged to directly engage a body which is received in said opening for biasing such body against said housing.

5. A fixture for cables and similar elongated bodies, comprising a housing including two sections which together define a body-receiving through opening, one of said sections having an internal chamber which communicates with said opening; coupling means provided on said sections for separably connecting the same; and at least one resilient finger secured to said one section and accommodated in said chamber, said resilient finger having a portion normally extending into said opening so as to bias a body which is received in said opening against said other section.

6. A fixture as set forth in claim 5, wherein said finger portion is provided with at least one body-engaging tooth.

7. A fixture for cables and similar elongated bodies, comprising a housing including two sections which together define a body-receiving through opening, one of said sections having a bottom wall which is distant from said other section and said one section defining an internal chamber which communicates with said opening and terminates at said bottom wall; coupling means provided on said sections for detachably connecting the same; and at least one resilient finger rigid with said one section and normally disposed in a plane which is substantially perpendicular to the plane of said bottom wall, said finger having a portion normally projecting into said opening so as to bias a body which is received in said opening against the other section.

8. A fixture as set forth in claim 7, comprising a pair of spaced resilient fingers, the distance between said fingers being such that their portions remain out of contact with each other when they are bent toward each other and into said chamber.

9. A fixture as set forth in claim 7, further comprising anchoring means for securing said bottom wall to a support, said anchoring means having a portion extending into and being fully accommodated in said chamber.

10. A fixture as set forth in claim 7 for cables of the type having mantles of synthetic plastic material which contains a softener substance, wherein said resilient finger consists of synthetic plastic material which is resistant to the action of such softener substance.

11. A fixture for cables and similar elongated bodies of substantially circular cross section, said fixture comprising a housing including two separable sections which together define a body-receiving through opening of such cross section as to accommodate a body with at least some play, one of said sections having a cutout forming part of said opening and being bounded by a polygonal wall; and resilient means constituting an integral part of the other section and being arranged to normally extend into said opening and to directly engage a body which is received in said opening so as to bias such body against the polygonal wall of said one section.

12. A fixture as set forth in claim 11, wherein said sections have a common plane of symmetry and wherein said polygonal wall is arranged in such a way that the axis of a body received in said opening automatically assumes a position in which its axis is located in said plane.

13. A fixture for cables and similar elongated bodies of substantially circular cross section, said fixture comprising a housing including two separable sections, said sections having registering cutouts of substantially semicircular shape which together define a substantially circular body-receiving through opening; and at least one resilient finger secured to one of said sections and having a tip normally extending into said opening so as to bias a body which is received in said opening against the other section.

14. A structure of the character described comprising, in combination, a support; and a plurality of fixtures for cables and similar elongated bodies, said fixtures being arranged side-by-side and each thereof comprising a first section secured to said support and a second section separably connected with the respective first section, the first and second sections of each fixture together defining a body-receiving through opening and one section of each fixture comprising at least one resilient member having a portion normally extending into the respective opening and being arranged to directly engage a body which is received in such opening so as to bias such body against the other section of the respective fixture.

15. A structure of the character described comprising, in combination, a support; a plurality of fixtures for cables and similar elongated bodies, said fixtures being arranged side-by-side and each thereof comprising a first section and a second section separable from the respective first section, the first and second sections of each fixture together defining a body-receiving through opening and one section of each fixture comprising at least one resilient member having a portion normally extending into the respective opening and being arranged to directly engage a body which is received in such opening so as to bias such body against the other section of the respective fixture; coupling means detachably connecting the first and second sections of each fixture; and anchoring means detachably connecting the first section of each fixture to said support.

16. A structure as set forth in claim 15, wherein said support consists of brittle material and wherein each of said anchoring means comprises an expansion anchor.

17. A structure as set forth in claim 15, wherein said resilient members form part of the first sections of the respective fixtures so that bodies received in the openings of said fixtures are biased against said second sections and away from said support.

18. A structure as set forth in claim 17, wherein the arrangement of said openings and of said resilient members is such that the points of bodies which are most distant from said support and which are accommodated in said openings are disposed in a common plane.

19. A structure of the character described comprising, in combination, a support; a plurality of fixtures for cables and similar elongated bodies having different diameters, said fixtures being arranged side-by-side and each thereof comprising a first section secured to said support and a second section separably connected with the respective first section, the first and second sections of each fixture together defining a body-receiving through opening of sufficient diameter so as to accommodate the largest of the bodies of different diameter to be supported by said fixtures, and said first section of each fixture comprising at least one resilient member having a portion arranged to normally extend into the respective opening so as to directly engage a body which is received in such opening and to bias such body against the second section of the respective fixture so that each of the differently dimensioned bodies is positioned at the same distance from said support; and coupling means connecting said fixtures to each other.

References Cited by the Examiner

UNITED STATES PATENTS

| 2,497,820 | 2/50 | Kielland | 24—126 |
| 2,616,646 | 11/52 | Matthysse | 248—65 |
| 2,650,948 | 9/53 | Findlay | 248—68 X |
| 2,745,199 | 5/56 | Kreinberg | 248—68 X |
| 2,937,835 | 5/60 | Csmereka | 248—74 |
| 3,087,009 | 4/63 | Blanchet | 248—68 X |

FOREIGN PATENTS 699,892  8/42  Germany.

CLAUDE A. LE ROY, *Primary Examiner.*